United States Patent
Schmitz et al.

(10) Patent No.: US 12,208,660 B2
(45) Date of Patent: Jan. 28, 2025

(54) AIR-CONDITIONING ARRANGEMENT FOR AN INTERIOR OF A VEHICLE

(71) Applicant: Siemens Mobility GmbH, Munich (DE)

(72) Inventors: Markus Schmitz, Langerwehe (DE); Irfan Kasap, Herne (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/575,914

(22) PCT Filed: May 25, 2022

(86) PCT No.: PCT/EP2022/064249
§ 371 (c)(1),
(2) Date: Jan. 2, 2024

(87) PCT Pub. No.: WO2023/274638
PCT Pub. Date: Jan. 5, 2023

(65) Prior Publication Data
US 2024/0262168 A1    Aug. 8, 2024

(30) Foreign Application Priority Data
Jun. 30, 2021 (DE) ..................... 10 2021 206 802.2

(51) Int. Cl.
*B61D 27/00* (2006.01)
*B60H 1/00* (2006.01)
*B60H 1/32* (2006.01)

(52) U.S. Cl.
CPC ....... *B60H 1/3227* (2013.01); *B61D 27/0018* (2013.01)

(58) Field of Classification Search
CPC ............ B60H 1/00457; B60H 1/00035; B60H 1/0005; B60H 2001/00142;
(Continued)

(56) References Cited

U.S. PATENT DOCUMENTS 3,807,490 A * 4/1974 Engel ................. B61D 27/0018
165/42
6,125,643 A * 10/2000 Noda ................. B60H 1/00914
62/196.4
(Continued)

FOREIGN PATENT DOCUMENTS

DE          19847504 C1    11/2000
DE      102012108886 A1     3/2014
(Continued)

*Primary Examiner* — Frantz F Jules
*Assistant Examiner* — Jason N Thompson
(74) *Attorney, Agent, or Firm* — Laurence A. Greenberg; Werner H. Stemer; Ralph E. Locher

(57) ABSTRACT

An air-conditioning arrangement for an interior of a vehicle, with an air-conditioning unit, for providing air-conditioned interior air, and a cooling assembly, which is arranged in the interior. The cooling assembly has a refrigeration circuit, which, for removing heat from a refrigerant of the refrigeration circuit, has a heat exchanger, which is exposed to the interior air. The heat exchanger is spatially divided into a hot-gas section and a low-temperature section. The interior air that is taken in for the heat removal by the heat exchanger is divided into an outgoing-air component and a recirculating-air component. The low-temperature section of the exchanger is exposed to the recirculating-air component of the interior air and the hot-gas section of the heat exchanger is exposed to the outgoing-air component of the interior air.

9 Claims, 6 Drawing Sheets

(58) Field of Classification Search
CPC ............ B60H 1/00371; B60H 1/00378; B60H 1/00849; B60H 2001/3289; B60H 2001/00121; B60H 2001/00135; B60H 1/3227; B60H 1/039; F24F 2012/008; F25D 29/003; B61D 27/0018
See application file for complete search history.

(56) References Cited

U.S. PATENT DOCUMENTS

| | | | |
|---|---|---|---|
| 9,242,528 B2* | 1/2016 | Graaf | B60H 1/00064 |
| 2011/0053484 A1* | 3/2011 | Yuasa | B61D 27/00 454/141 |
| 2011/0284309 A1* | 11/2011 | Gooden | F01P 7/16 180/339 |
| 2013/0252527 A1* | 9/2013 | Tscheng | B61D 27/0018 454/107 |
| 2014/0262132 A1* | 9/2014 | Connell | B60H 1/00321 165/96 |
| 2014/0335773 A1* | 11/2014 | Takahashi | F24F 13/06 454/108 |
| 2019/0381866 A1 | 12/2019 | Kuebeck et al. | |

FOREIGN PATENT DOCUMENTS

| | | |
|---|---|---|
| DE | 102014226512 A1 | 6/2016 |
| DE | 102016219205 A1 | 4/2018 |
| DE | 102019210084 A1 | 1/2021 |
| EP | 3538386 A1 | 9/2019 |

\* cited by examiner

AIR-CONDITIONING ARRANGEMENT FOR AN INTERIOR OF A VEHICLE

FIELD AND BACKGROUND OF THE INVENTION

The invention relates to an air-conditioning arrangement for an interior of a vehicle. The air-conditioning arrangement comprises an air-conditioning unit for providing air-conditioned interior air, and a cooling assembly, which is arranged in the interior and has a refrigeration circuit, which, for removing heat from a refrigerant of the refrigeration circuit, has a heat exchanger, which is exposed to the interior air.

An air-conditioning arrangement of this kind is present, for example, in interiors of vehicles, especially rail vehicles. Thus, the interior of a galley is air-conditioned, as regards its interior air, by means of an air-conditioning unit which provides significant parameters of the interior air, such as temperature and humidity, according to specified values. Also 17 provided in such a galley are cooling assemblies which are used to provide refrigeration capacity in, for example, fridges, freezers, cooled display cabinets etc.

Removal of heat from a refrigerant of the cooling assembly takes place at the heat exchanger/condenser of the cooling assembly, more specifically by means of the interior air present in the interior.

SUMMARY OF THE INVENTION

With such an air-conditioning arrangement, the object is to remove the waste heat from a cooling assembly as efficiently as possible.

This object is achieved by means of an air-conditioning arrangement as claimed.

According to this, the air-conditioning arrangement described at the outset is characterized in that the heat exchanger is spatially divided into a hot-gas section and a low-temperature section, the interior air that is drawn in for heat removal from the heat exchanger is divided into an outgoing-air component and a recirculated-air component, wherein the low-temperature section of the heat exchanger is exposed to the recirculated-air component of the interior air and the hot-gas section of the heat exchanger is exposed to the outgoing-air component of the interior air.

The measure of exposing the hot-gas section to the outgoing-air component and the low-temperature section to the recirculated-air component ensures that the recirculated-air component to be fed back into the interior of the vehicle has a relatively low temperature, and therefore the air-conditioning unit which provides the interior air for the interior of the vehicle can be operated at a lower (refrigeration) capacity. In contrast, the hot-gas section of the heat exchanger is exposed to the outgoing-air component, which is discharged from the vehicle after passing through the hot-gas section.

In particular, it is also possible for the low-temperature section to be exposed not only to the air to be delivered subsequently as recirculated air to the air-conditioning unit but also to an overall air flow, which is divided into a recirculated-air component and an outgoing-air component, which is to be forwarded to the hot-gas section, only after passing through the low-temperature section.

In principle, heat exchangers of all kinds can be used as heat exchangers for the cooling assembly. However, it is preferred that the heat exchanger or condenser of the refrigeration circuit is designed as a cross-counterflow heat exchanger since this design has a particularly high efficiency under the boundary conditions prevailing in a vehicle.

The hot-gas section and the low-temperature section of the heat exchanger can directly adjoin one another. Alternatively, it is possible for a spatial separation to be provided between the hot-gas section and the low-temperature section of the heat exchanger.

In a development of the invention, the hot-gas section is assigned a fan for drawing in the outgoing-air component from the interior air, and the low-temperature section is assigned a fan for drawing in the recirculated-air component from the interior air. In this embodiment, cooling air (subsequent recirculated air or outgoing air) is drawn in separately. The outgoing-air component is fed directly to the hot-gas section, and the recirculated-air component of the interior air is fed directly to the low-temperature section.

Alternatively, it is possible to provide an air distribution device, which is arranged between the hot-gas section and the low-temperature section and divides the interior air drawn in into the outgoing-air component and the recirculated-air component. In this embodiment, the entire interior air, which is drawn in by means of a fan for example, passes through the low-temperature section of the refrigeration assembly. On an outlet side of the low-temperature section, the air distribution device couples a recirculated-air component out of the air flow present there and feeds it back into the interior of the vehicle. A remaining ongoing-air component of the interior air drawn in is forwarded to the hot-gas section of the heat exchanger and removes heat from the coolant of the refrigeration circuit of the cooling assembly in the hot-gas section.

The volume flow of the outgoing-air component is preferably smaller than the volume flow of the recirculated-air component. Since the outgoing-air component leaves the heat exchanger at a significantly higher temperature than the recirculated-air component, it is fundamentally advantageous if the recirculated-air component is large in comparison with the outgoing-air component. However, care should be taken to ensure that the required final temperature which the coolant must have when leaving the heat exchanger is also achieved. Depending on the application, there are thus boundary conditions to be observed in respect of a minimum component of interior air which is to be discharged as outgoing air.

The volume flow of the outgoing-air component is preferably less than 40% of the volume flow of the interior air drawn in.

In particular, the cooling assembly can be embodied as a gas cooler, in which the hot-gas section and the low-temperature section are each spatially separated from one another and are of generally rectangular design, optionally with the same width dimensions.

Exemplary embodiments of the invention are explained in greater detail below with reference to the drawings, wherein identical components are denoted by the same reference signs. In the drawings:

DETAILED DESCRIPTION OF THE INVENTION

Figure 1:
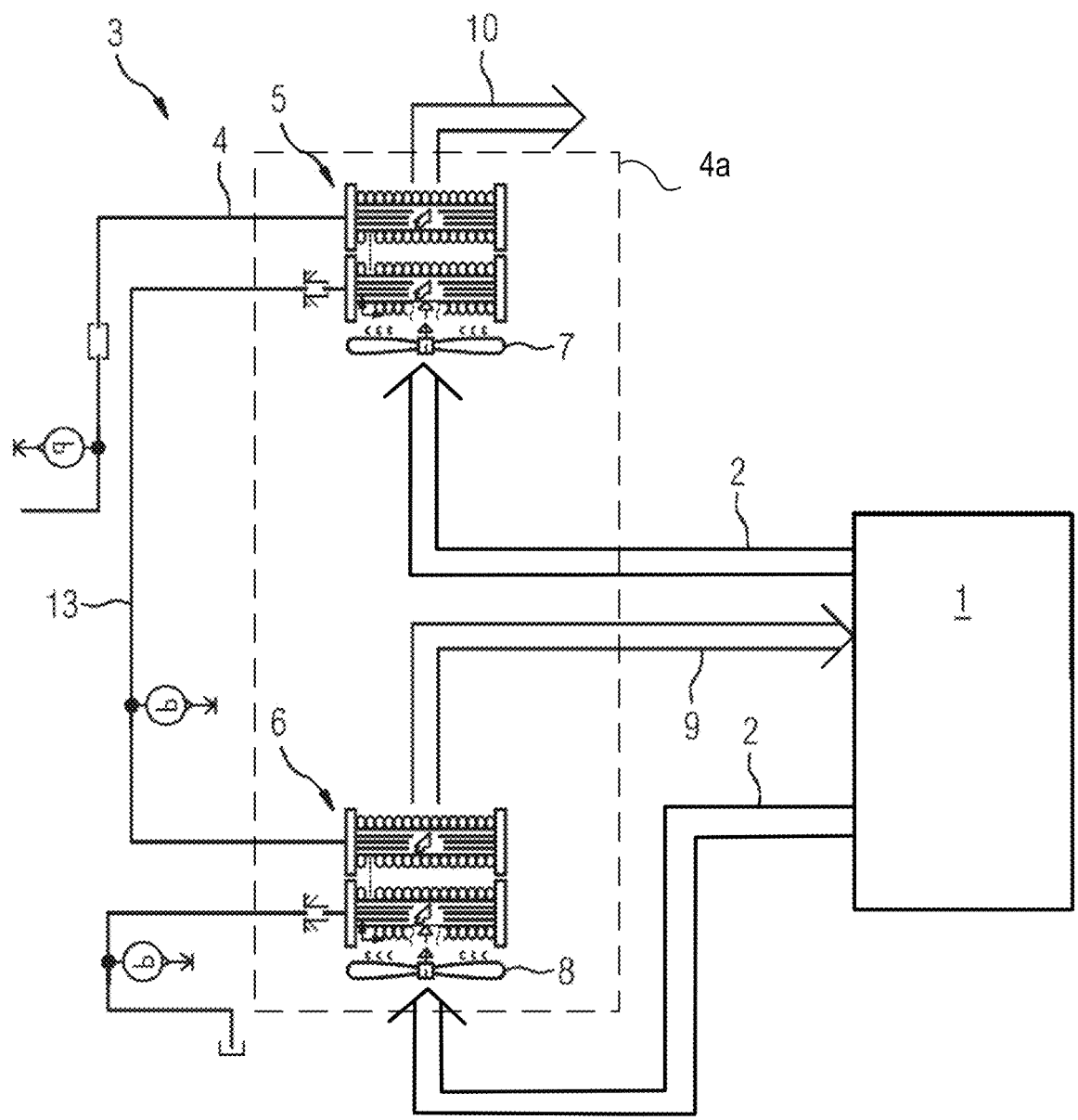
FIG. 1 shows a schematic illustration of an air-conditioning arrangement for a vehicle interior in a first embodiment.

FIGS. 1 to 4 illustrate a first embodiment of an air-conditioning arrangement for a galley as an example of an interior of a vehicle, in particular a rail vehicle. An air-conditioning unit 1 provides air-conditioned interior air 2 for the interior of the vehicle. Arranged in the interior of the vehicle is a cooling assembly, in the present exemplary embodiment a gas cooler 3, which is used to provide refrigeration capacity for fridges, freezers, and cooled display cabinets, for example. The gas cooler 3 is operated with a refrigerant, which is guided in a refrigeration circuit 4. For reasons of clarity, FIG. 1 shows only a condenser of this refrigeration circuit 4, said condenser being embodied as a heat exchanger 4a and being used to remove heat from the refrigerant.

The condenser 4a is divided spatially into a hot-gas section 5 and a low-temperature section 6. In the present exemplary embodiment, the hot-gas section 5 is assigned a fan 7, and the low-temperature section 6 is assigned a fan 8. Both fan 7 and fan 8 draw in interior air 2 from the interior of the vehicle. Here, by way of example, the air volume flow delivered by fan 7 can be 350 m³/h, and the air volume flow delivered by fan 8 can be 500 m³/h.

With the aid of fan 8, interior air is guided past the low-temperature section 6 and, after passing through the low-temperature section 6, is fed back to the air-conditioning unit 1 as recirculated air 9. The air conditioning unit 1 conditions the recirculated air 9 in respect of temperature and humidity in such a way that it can be discharged into the interior of the vehicle again as interior air 2. Typically, the interior air 2 is a mixture of the recirculated air 9 and fresh air drawn in from an environment of the vehicle.

The interior air drawn in by the fan 7 passes through the hot-gas section 5 and is then discharged to the outside of the vehicle as outgoing air 10.

Figure 2:
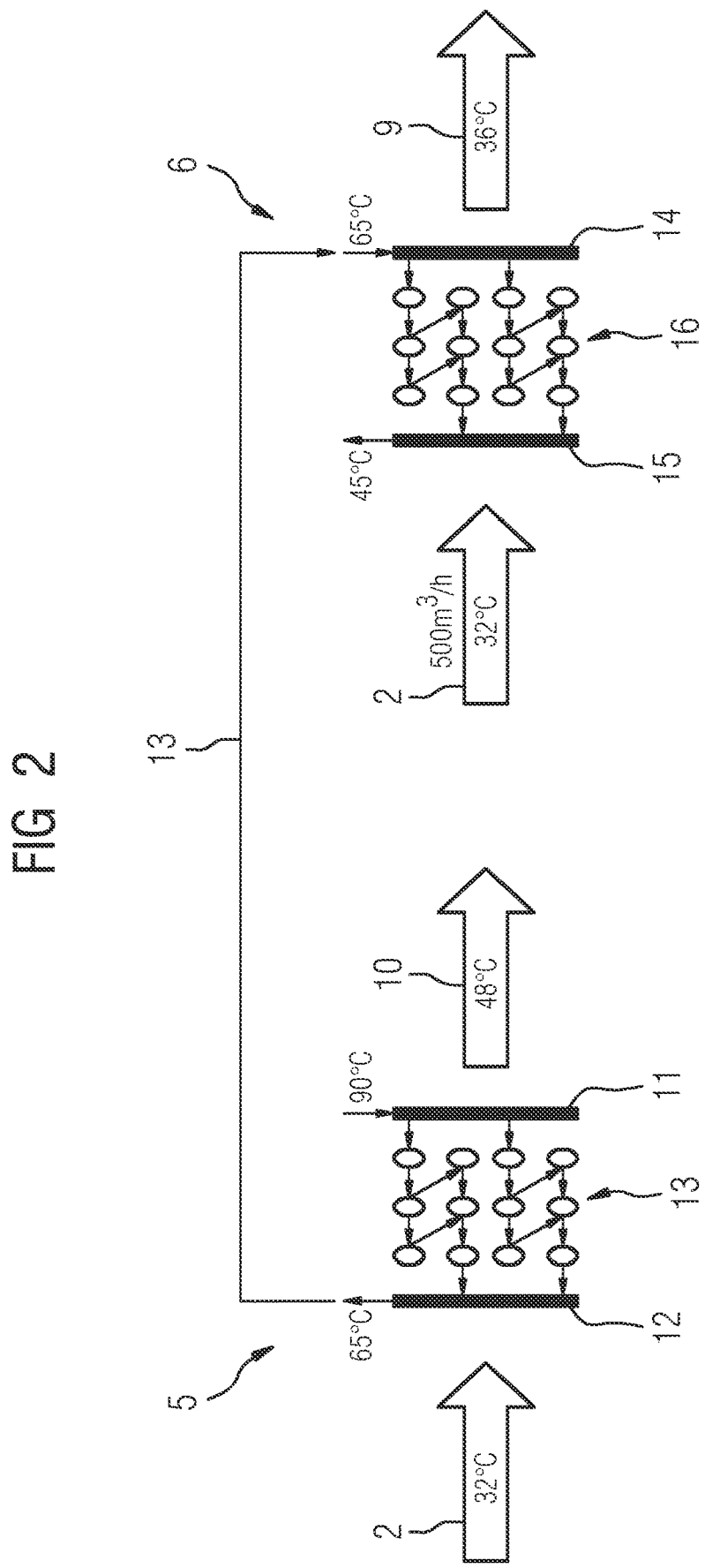
FIG. 2 shows a schematic illustration of a flow circuit of the air-conditioning arrangement of FIG. 1.
Figure 3:
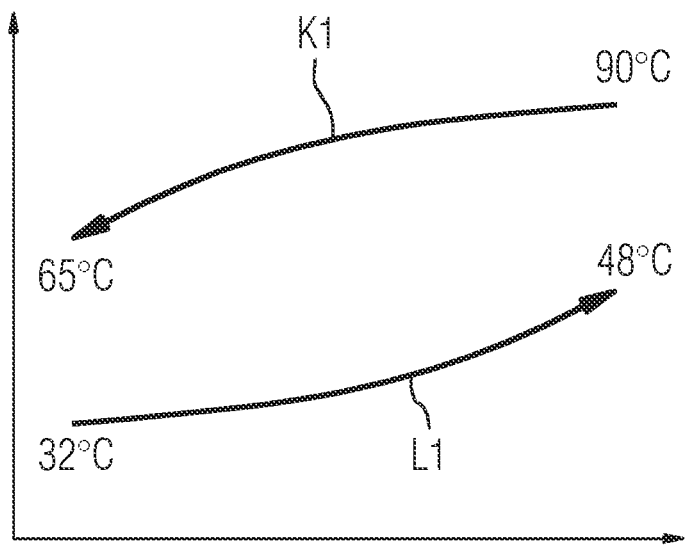
FIG. 3 shows a schematic, graphical illustration of temperature profiles of a hot-gas section of the air-conditioning arrangement of FIG. 1.

The interaction between the respectively drawn-in interior air 2 and the low-temperature section 6 and the hot-gas section 5 is shown in greater detail in FIG. 2. The structure of the heat exchanger, which forms the condenser of the refrigeration circuit of the gas cooler 3, corresponds to that of a cross-counterflow heat exchanger. In the region of a distribution line 11, the temperature of the refrigerant flowing into the hot-gas section 5 is 90° C. Provided between the distribution line 11 and a collecting line 12 is a line arrangement 13 in the region of which the hot-gas section 5 interacts with interior air to remove heat from the refrigerant. This has the effect that the temperature of the coolant in a collecting line 12 is 65° C. This temperature profile for the coolant is also evident from FIG. 3, wherein a curve K1 represents the temperature profile of the coolant, and a curve L1 represents a temperature profile of the interior air 2, in each case over the distance between the collecting line 12 and the distribution line 11. After passing through the hot-gas section 5, the interior air 2 used to cool the coolant in the region of the hot-gas section 5 is discharged as the outgoing air 10. In this case, the capacity of fan 7 is such that approximately 350 m³/h of interior air 2 is drawn in in the region of the hot-gas section 5.

The refrigerant cooled to a temperature of 65° C. in the region of the hot-gas section 5 is passed by means of a flow line 13 to a distribution line 14 of the low-temperature section 6. Arranged between the distribution line 14 and a collecting line 15 of the low-temperature section 6 there is once again a line arrangement 16, in the region of which an interaction takes place between the interior air 2 and the refrigerant of the refrigeration circuit of the gas cooler 3. In the region of the collecting line 15, the coolant temperature in the example explained here is 45° C. The interior air 2 which has passed through the low-temperature section 6 is fed to the air-conditioning unit 1 as recirculated air 9 for aftertreatment.

Figure 4:
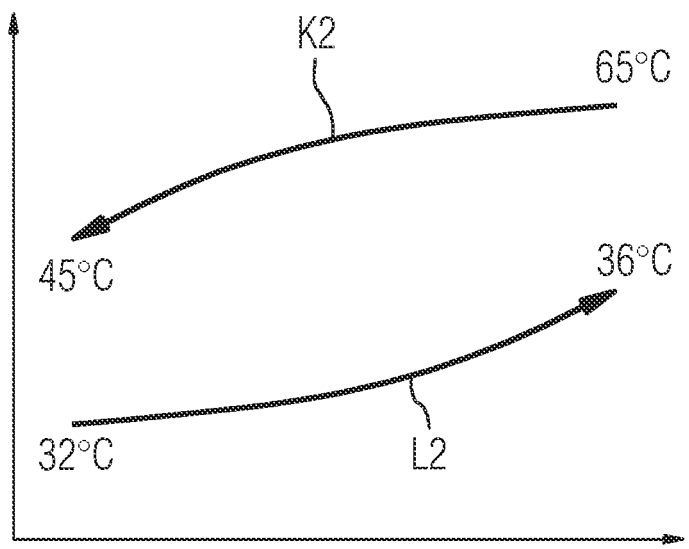
FIG. 4 shows a schematic, graphical illustration of temperature profiles of a low-temperature section of the air-conditioning arrangement of FIG. 1.

FIG. 4 shows schematically the temperature profiles K2 and L2 for the refrigerant and the interior air in the region of the low-temperature section 6.

Both in the region of the hot-gas section 5 and in the region of the low-temperature section 6, the temperature of the interior air drawn in is 32° C. The temperature of the recirculated air 9 is 36° C., and therefore the air-conditioning unit 1, which provides the interior air 2 for the interior of the vehicle, has only to supply a relatively low refrigeration capacity in order to provide a desired setpoint temperature for the interior air 2 to be introduced into the passenger compartment.

FIGS. 5, 6, 7 and 8 illustrate a second exemplary embodiment, in which only the manner in which the interior air 2 is drawn in in the region of the hot-gas section 5 and the manner in which the recirculated air 9 is guided from the low-temperature section 6 to the air-conditioning unit 1 has been changed in comparison with the first exemplary embodiment.

Figure 5:
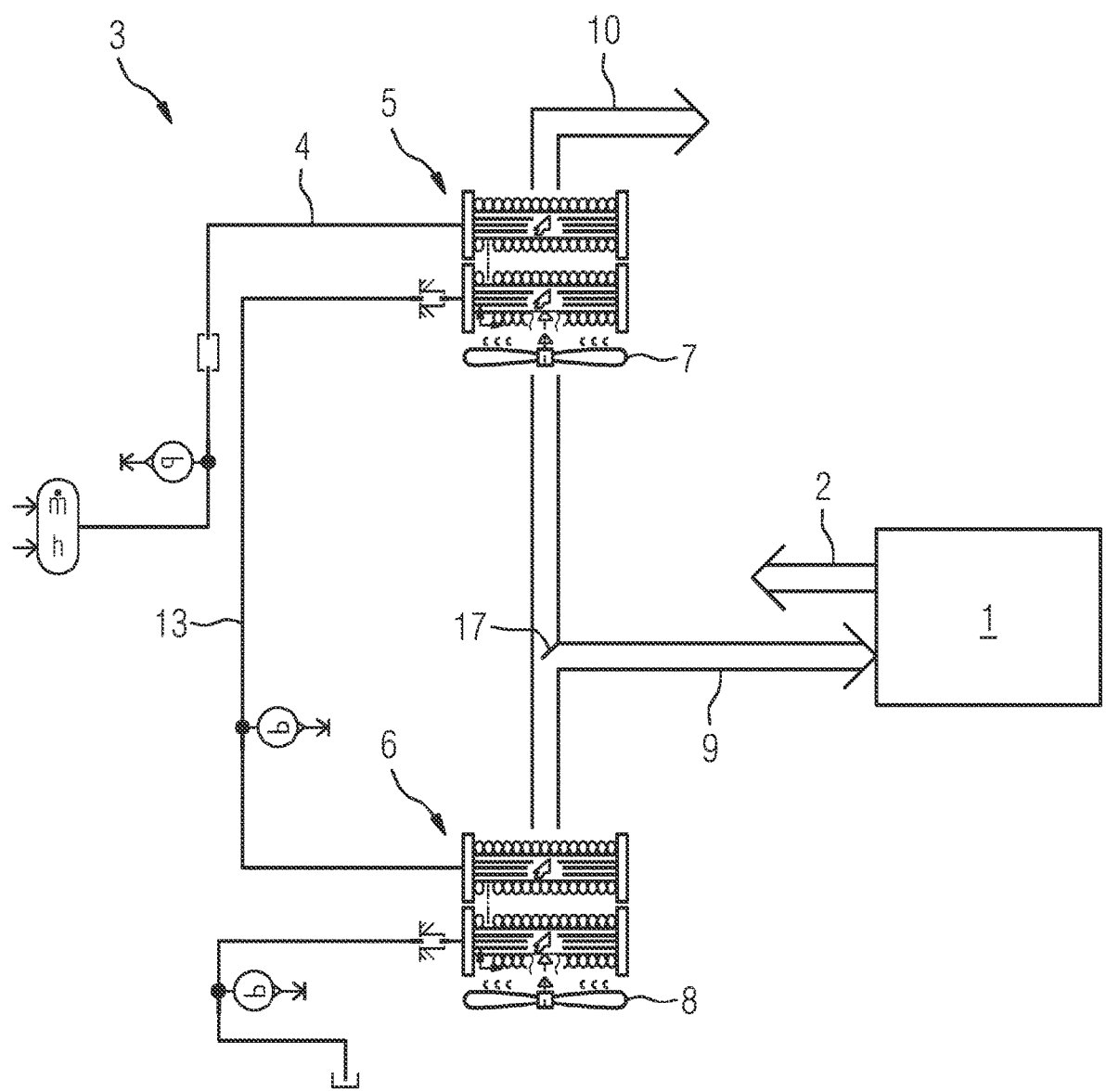
FIG. 5 shows a schematic illustration of an air-conditioning arrangement for a vehicle interior in a second embodiment.

In contrast to the first exemplary embodiment, a fan for drawing in interior air 2 directly for the hot-gas section 5 is dispensed with in the air-conditioning arrangement according to FIG. 5. Instead, interior air 2 is drawn in exclusively by the fan 8 assigned to the low-temperature section 6. After passing through the low-temperature section 6, all the interior air 2 drawn in is guided in the direction of the hot-gas section 5. Arranged on this flow path there is, however, an air distribution device 17, which can be embodied as a baffle. This air distribution device 17 couples out a component of the air flow coming from the low-temperature section 6, and this is to be guided as the recirculated air 9 to the air-conditioning unit 1. A component of the air flow coming from the low-temperature section 6 which is not coupled out is fed to the hot-gas section 5 and leaves the gas cooler 3 as the outgoing air 10.

Figure 6:
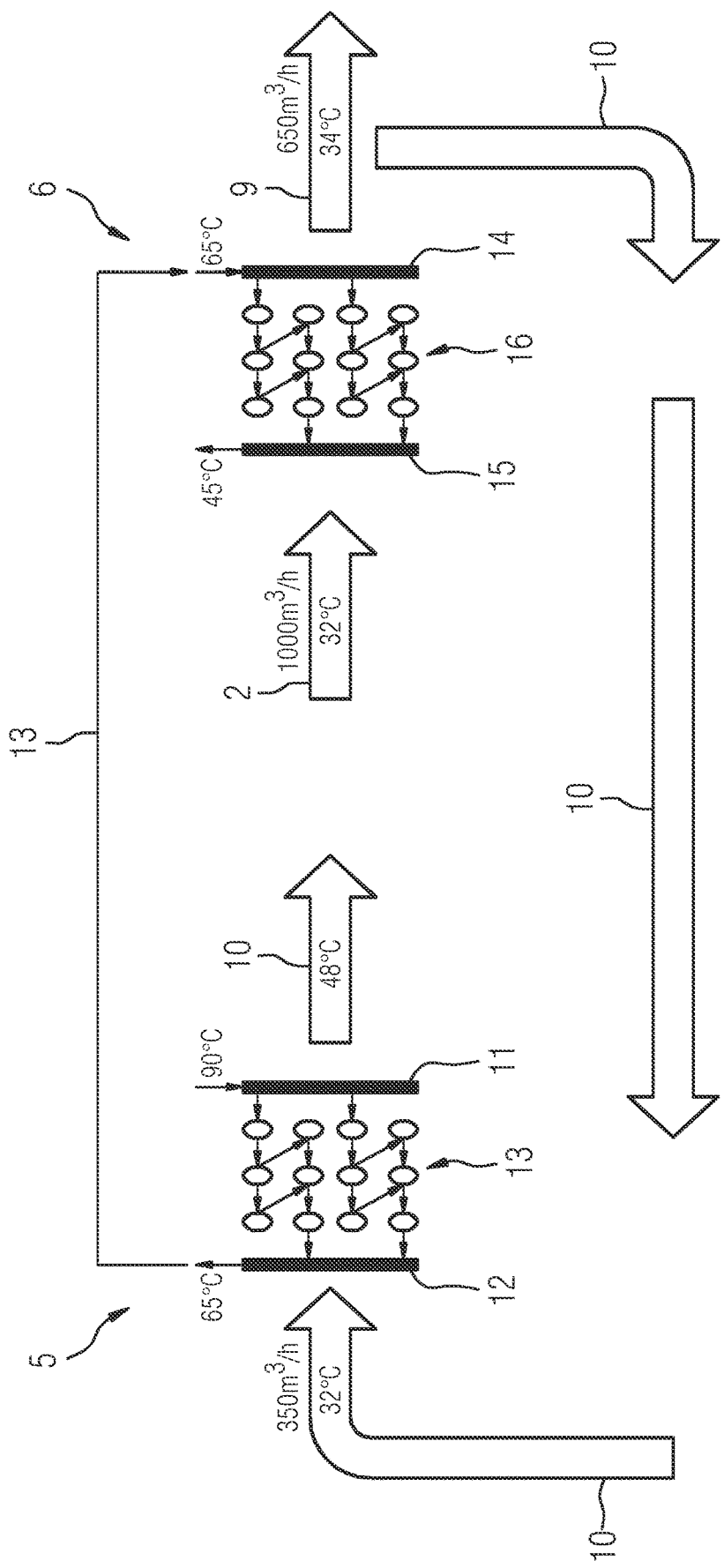
FIG. 6 shows a schematic illustration of a flow circuit of the air-conditioning arrangement of FIG. 5.

As can be seen from FIG. 6, fan 8 draws in an air volume flow of 1000 m³/h, for example, and, after it has left the low-temperature section 6, a component of 650 m³/h is coupled out as recirculated air 9, while the remaining 350 m³/h is fed to the hot-gas section 5 and leaves the latter as the outgoing air 10.

Figure 7:
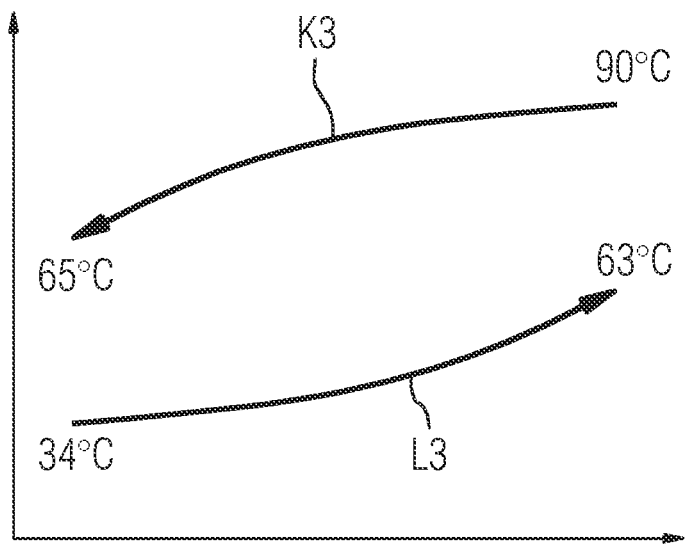
FIG. 7 shows a schematic, graphical illustration of temperature profiles of a hot-gas section of the air-conditioning arrangement of FIG. 5.

For the temperature profiles of the coolant and the air passing through the hot-gas section 5, curves K3, L3 in FIG. 7 are obtained. The conditions at the low-temperature section 6 are evident from FIG. 8, cf. the temperature profiles K4, L4. It is apparent that the coolant has a temperature of 90° C. at the distribution line 11 of the hot-gas section 5, and this has fallen to 65° C. in the region of the collecting line 12 of the hot-gas section 5 after interaction with the outgoing air flow 10. In the region of the low-temperature section 6, the coolant temperature falls from 65° C. to 45° C.

Figure 8:
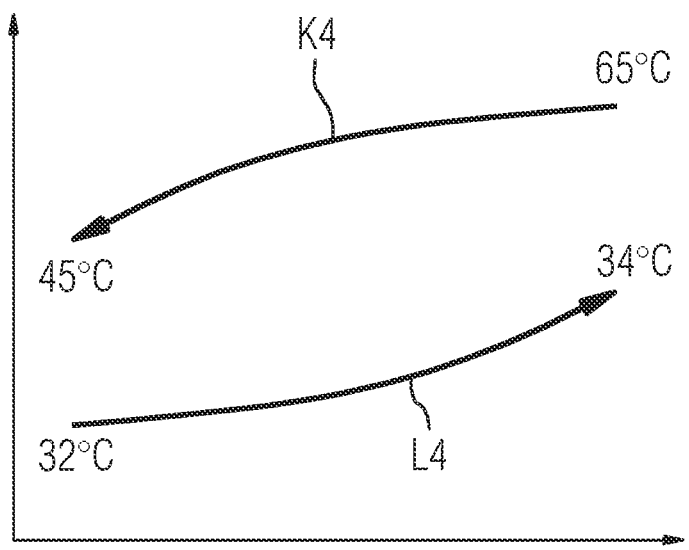
FIG. 8 shows a schematic, graphical illustration of temperature profiles of a low-temperature section of the air-conditioning arrangement of FIG. 5.

The curve L4 in FIG. 8 illustrates that the temperature of the air flow is 34° C. after passing through the low-temperature section 6. This is the temperature which is then approximately also present at the air-conditioning unit 1 for the recirculated air 9. In comparison with the first exemplary embodiment, the recirculated air temperature is thus 2° C. lower, and therefore the power demands on the air-conditioning unit 1 for conditioning the recirculated air 9 are more favorable overall.

The invention claimed is:

1. An air-conditioning arrangement for an interior of a vehicle, the air-conditioning arrangement comprising:
   an air conditioner providing air-conditioned interior air;
   a cooling assembly disposed in the interior, said cooling assembly having a refrigeration circuit with a heat exchanger for removing heat from a refrigerant of said refrigeration circuit;
   said heat exchanger being spatially divided into a first section and a second section;
   wherein the interior air that is drawn in for heat removal from said heat exchanger is output from said heat exchanger as an outgoing-air component and a recirculating-air component; and
   wherein said second section of said heat exchanger is exposed to the recirculating-air component of the interior air and said first section of said heat exchanger is exposed to the outgoing-air component of the interior air.

2. The air-conditioning arrangement according to claim 1, wherein said heat exchanger is a cross-counterflow heat exchanger.

3. The air-conditioning arrangement according to claim 1, wherein said first section and said second section of said heat exchanger directly adjoin one another.

4. The air-conditioning arrangement according to claim 1, wherein said first section and said second section of said heat exchanger are spatially separated from one another.

5. The air-conditioning arrangement according to claim 1, which comprises:
   a fan assigned to said first section of said heat exchanger for drawing in the outgoing-air component from the interior air into said first section; and
   a fan assigned to said second section of said heat exchanger for drawing in the recirculating-air component from the interior air into said second section.

6. The air-conditioning arrangement according to claim 1, which comprises an air distribution device arranged between said first section and said second section and configured to divide the interior air drawn in into the outgoing-air component and the recirculating-air component.

7. The air-conditioning arrangement according to claim 1, wherein a volume flow of the outgoing-air component is smaller than a volume flow of the recirculating-air component.

8. The air-conditioning arrangement according to claim 7, wherein the volume flow of the outgoing-air component that is drawn into said first section of said heat exchanger is less than 40% of a volume flow of the interior air that is drawn in.

9. The air-conditioning arrangement according to claim 1, wherein said cooling assembly is a gas cooler and each of said first section and said second section has a substantially rectangular design.

* * * * *